United States Patent [19]
Riley

[11] 3,764,029
[45] Oct. 9, 1973

[54] TRUCK PRE-LOADER

[76] Inventor: Joseph L. Riley, 14109 S.E. Fair Oaks Ave., Milwaukie, Oreg. 97222

[22] Filed: June 2, 1972

[21] Appl. No.: 259,221

[52] U.S. Cl. .................................. 214/41, 214/85.5
[51] Int. Cl. ............................................. B65g 67/12
[58] Field of Search .......................... 214/38 CC, 41

[56] References Cited
UNITED STATES PATENTS

| | | | |
|---|---|---|---|
| 2,919,822 | 1/1960 | Darnell | 214/41 |
| 3,549,027 | 12/1970 | Batson | 214/38 CC |

*Primary Examiner*—Robert G. Sheridan
*Attorney*—Oliver D. Olson

[57] ABSTRACT

A frame mounts a pair of longitudinally spaced, transverse cradles adapted to support a load between them. The rearward cradle is movable vertically and the forward cradle is pivotable between a downwardly retracted position and an upwardly extending, operative position. With a load supported between the cradles and the vertically movable cradle elevated to a level above a truck bed, a cable is interconnected between the frame and the load at a position on the latter spaced rearwardly of the rearward cradle. Then, by elevating the rearward cradle still further, the forward end of the load is elevated from the forward cradle to a level above the truck bed, whereupon the forward cradle is retracted. A truck then may be moved to position its bed under the portion of the load extending forwardly of the rearward cradle, whereupon lowering of the latter effects deposit of the load on the truck bed.

25 Claims, 17 Drawing Figures

Patented Oct. 9, 1973

Patented Oct. 9, 1973

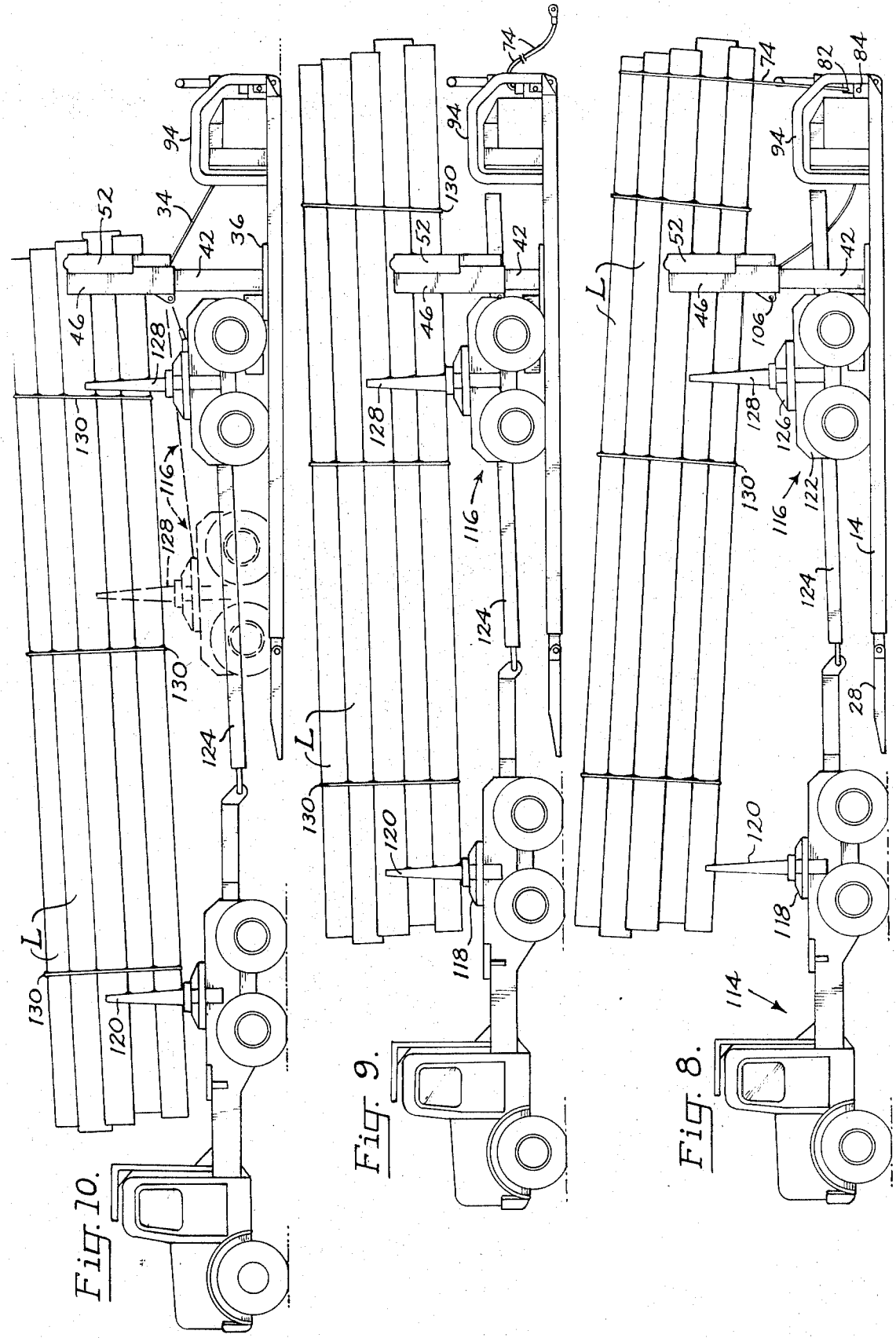

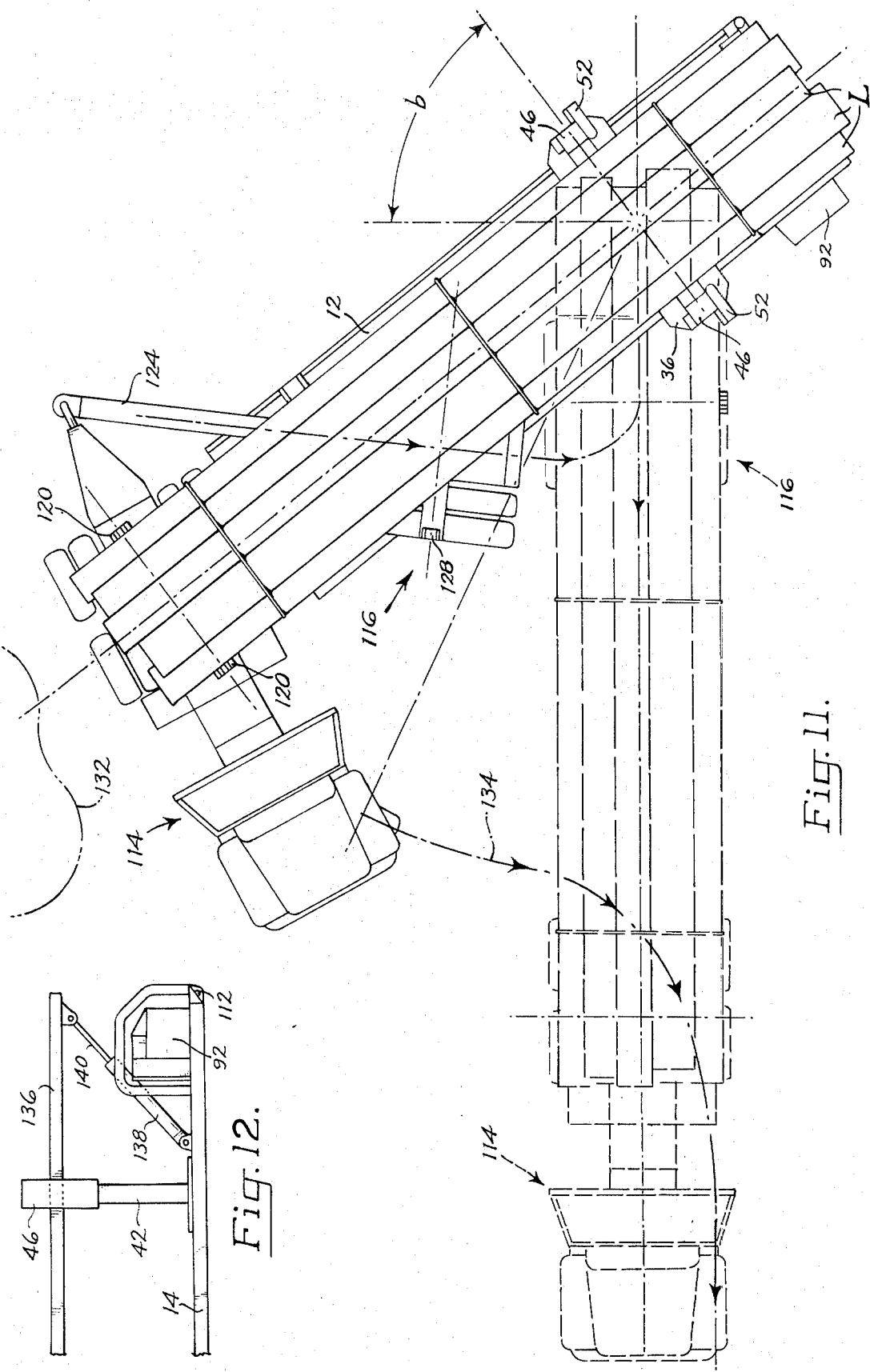

Patented Oct. 9, 1973

3,764,029

TRUCK PRE-LOADER

BACKGROUND OF THE INVENTION

This invention relates to loaders, and more particularly to apparatus by which material may be assembled into a composite load for subsequent transfer to a truck.

Although the pre-loader of this invention is capable of a wide variety of uses, it is of particular utility in the pre-loading of logs preliminary to deposit on a truck for transport from the woods.

It is at present generally accepted practice in the logging industry to load a logging truck directly from the log collecting site in the woods. Accordingly, the truck and truck operator are unproductive for the period of time required to assemble a load of logs on the truck. Moreover, the loading time may vary considerably, depending upon such factors as the type of loading equipment and the character of the logs, which sometimes require trial and error selection in making up a balanced and properly weighted load. At the least, the loading time represents a significant cost factor.

Because the foregoing, attempts have been made heretofore to provide pre-loading apparatus by which to assemble a load of logs for subsequent transfer to a logging truck. Such pre-loaders are characterized by structures which include longitudinally spaced, fixed supports for opposite end portions of the load of logs. Thus, the truck operator is required to maneuver the truck between the lateral standard of at least one of the supports. The time involved in such maneuvering is dependent at least in part upon the skill of the truck operator and in part upon the nature of the pre-loading site. In many instances the loading site is of such restricted area as to be completely impracticable for use of such pre-loaders. In any event the time involved in maneuvering a logging truck relative to the pre-loader reduces the unproductive time so little that the capital investment in such pre-loaders is not justified.

SUMMARY OF THE INVENTION

In its basic concept the pre-loader of this invention functions to support an assembled elongated load in elevated position adjacent one end only, thereby enabling the manipulation of a truck under the unobstructed projecting portion of the load with speed and facility.

It is by virtue of the foregoing basic concept that the principal objective of this invention is achieved; namely, to overcome the aforementioned disadvantages of prior loading techniques and pre-loaders.

Another important object of this invention is the provision of a truck pre-loader of the class described which allows lateral swinging of the load when deposited on a truck, thereby enabling use of the pre-loader in severely restricted loading areas.

A further important object of this invention is the provision of a truck pre-loader of the class described which includes simplified means for self-loading and -unloading relative to a transport vehicle.

Still another important object of this invention is the provision of a truck pre-loader of the class described which accommodates the preloading of a wide variety of materials of varying lengths.

A still further important object of this invention is the provision of a truck pre-loader of the class described which functions, in connection with a logging truck, to effect changes in the overall length of the logging truck to accommodate the latter to a given length of load.

A further important object of this invention is the provision of a truck pre-loader of the class described which is of simplified construction for economical manufacture, which is versatile in its operation and adaptable to the pre-loading of a wide variety of materials, and which is of rugged construction for long service life with minimum maintenance and repair.

The foregoing and other objects and advantages of this invention will appear from the following detailed description taken in connection with the accompanying drawings of preferred embodiments.

BRIEF DESCRIPTION OF THE DRAWINGS

FIGS. 6, 7, 8 and 9 are side elevational views showing sequences of operation of the pre-loader in loading a pre-assembled load of logs onto a logging truck.

FIG. 10 is a side elevational view illustrating the manner in which the pre-loader functions to adjust the overall length of a logging truck.

FIG. 11 is a plan view illustrating the manner in which the pre-loader accommodates the maneuvering of a logging truck relative thereto in a severely confined area.

FIG. 12 is a fragmentary view in side elevation of a second form of truck pre-loader embodying the features of this invention.

DESCRIPTION OF PREFERRED EMBODIMENTS

The pre-loader of this invention includes a base upon which the operational components are supported. In the embodiment illustrated, the base includes an elongated base frame which comprises a pair of laterally spaced truck wheel supports each of which is formed of a lower plate 10 and an upper deck plate 12 spaced vertically therefrom by means of laterally spaced vertical beams 14. The pair of wheel supports are interconnected by laterally extending, longitudinally spaced beams 16.

Figure 4:
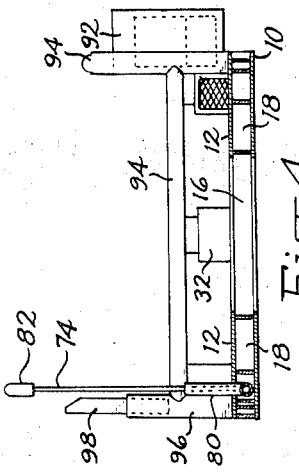
FIG. 4 is a transverse sectional view taken on the line 4—4 in FIG. 1.

The base frame preferably is made longitudinally adjustable. To this end the laterally spaced beams 14 define with the lower and upper plates a pair of laterally spaced, longitudinal guide openings 18 (FIGS. 3 and 4) arranged to receive freely therein a pair of laterally spaced, elongated stanchion beams 20 (FIGS. 1 and 2) of corresponding rectangular cross section. These beams extend forwardly of the openings and are joined together at their forward ends by a transverse beam 22. An eyelet 24 is provided on the beam 22 for connection of a cable, chain, or other suitable line extending from a truck or tractor which may be employed to extend the assembly. Locking means, such as registering openings in the beams 14 and 20 for a locking pin, secure the beams 20 in selected positions of extension, as will be understood.

Projecting outwardly from opposite sides of the beam 22 are pivot shafts 26 which pivotally mount the lower ends of a pair of elongated stanchions 28. These are interconnected intermediate their ends by a transverse beam 30. This beam, together with the projecting portions of the stanchions, form a forward cradle for the reception of logs or other material to be supported, when the stanchions are pivoted to their operative, upright position. In the upright position the stanchions incline forwardly to a slight degree from vertical, for example about 5°. This enables the stanchions to be pivoted downward in the forward direction by gravity to a retracted position in which they form forward extensions of the base frame. A mechanical stop (not shown) between the stanchions 28 and beam 22 limits the rearward pivotal movement of the stanchions to the upright position described.

Power means is provided for raising the stanchions to the operative position. In the embodiment illustrated such power means comprises a power winch 32 mounted at the forward end of the base frame and carrying an elongated cable, rope, or other suitable line 34. The free end of the line is adapted for connection to the beam 30 interconnecting the stanchions. The winch preferably is driven by an hydraulic motor.

The base also preferably includes a turntable mounted for rotation on a vertical axis centrally of and adjacent the rearward end of the base frame. Thus a turntable plate 36 carried a central trunnion 38 mounted in a bearing carried by the frame and located on the longitudinal center line of the latter.

The turntable plate supports a vertically adjustable rear load support assembly. This assembly includes a substantially U-shaped guide frame (FIG. 3) having a transverse structural member 40 and laterally spaced, upstanding guide posts 42. A correspondingly U-shaped load support member, having a transverse load-bearing member 44 and laterally spaced, upstanding arms 46, is supported by the guide frame for vertical reciprocation. To this end, the upstanding laterally spaced arms 46 are hollow and receive freely therein the upstanding laterally spaced posts 42 of the guide frame. The posts of the guide frame also are hollow and are open at their upper ends. Within each of the associated hollow arms 46 and posts 42 there is an upstanding fluid pressure piston-cylinder unit. The bottom end of the unit, for example cylinder 48, engages the bottom end of the guide frame. The piston rod 50 of the unit extends upwardly through the cylinder and its upper end is connected to the upper end of the corresponding arm 46 of the load support member. Accordingly, by the application of fluid pressure, preferably hydraulic, selectively to the opposite ends of the cylinders, the units are extended and retracted correspondingly to raise and lower the load-supporting member relative to the guide frame.

The load support member also preferably is provided with a pair of laterally spaced, load engaging stakes which, also preferably, are movable toward and away from each other. To this end, each of a pair of elongated stakes 52 is mounted pivotally at its lower end on a shaft 54 (FIG. 3) extending longitudinally from the rearward side of the load support member. The stake extends upward alongside the associated arm 46 of the load support member, with its inner side disposed inwardly of the corresponding inner side of the arm. The stake is hollow and therein is contained an extensible fluid pressure piston-cylinder unit. One end of the unit, for example cylinder 56, is mounted pivotally on a shaft 58 carried by the load support member. The opposite end of the unit, for example the piston rod 60, is connected to a pivot shaft 62 carried by the stake. Accordingly, by the application of fluid pressure to opposite ends of the cylinder, the unit is extended and retracted correspondingly to pivot the stake inward and outward relative to the associated arm of the load support member.

Means is provided for maintaining the load support member transversely of the base frame, parallel to the transverse position of the forward stanchions 28. In the embodiment illustrated this transverse position is maintained resiliently by means of a pair of elongated coil springs 64 (FIG. 1) or other resilient members which interconnect the turntable plate 36 and base frame. Thus, although the turntable assembly may rotate about the vertical axis of the trunnion 38 within the limits of the angles $a$, determined by the stops 66, the resilient members function to return the assembly to the transverse position illustrated in full lines.

Means also is provided for locking the turntable and supported assembly in said transverse position, when the load support member is retracted to its lowermost position. For this purpose a pair of laterally spaced lugs 68 project downward from the load support member for free reception in registering openings 70 in the turntable plate and underlying frame.

In the embodiment illustrated there is also provided on the turntable plate 36 a wheel guide for assisting in the aligning of a truck or trailer with the rear load support. Thus, there is mounted on the turntable plate a box-like guide member 72 of trapezoidal shape in plan (FIG. 1) which tapers forwardly from the turntable. The tapered sides thus serve to be engaged by the truck or trailer wheels during backing of the latter into the pre-loader and to shift the wheels laterally on the deck plates 12.

The pre-loader of this invention also is provided with means for elevating the forward portion of a load from the forward cradle. In the embodiment illustrated in FIGS. 1–11, this means comprises an elongated cable, chain or other form of flexible restraining line 74, which is adapted to be looped over the rearward end of a load and anchored at its opposite ends to the base frame. In the embodiment illustrated, one end of the line is attached to the projecting end of the piston rod 76 of an elongated fluid pressure piston-cylinder unit. The cylinder 78 of the unit is contained within and anchored to one of the wheel supports of the base support. The line extends rearwardly from the piston rod 76 and thence upward through a hollow guide tube 80. The free end portion of the line then may be looped over the rearward end of a load. The free end of the line is provided with an eyelet 82 or other form of coupling adapted to be secured to the base frame adjacent the side opposite the guide tube 80. In the embodiment illustrated the eyelet is adapted to receive freely therethrough an anchor pin 84 mounted retractably in an anchor bracket 86 on the base frame.

Also mounted on the base member is a source of fluid pressure for the winch drive motor and the various piston-cylinder units described hereinbefore. The source of power illustrated is an hydraulic pump 88 driven by a gasoline engine 90. These components are mounted within a housing 92. In the preferred embodiment illustrated the housing is mounted upon the base frame for pivotal movement between the normal operative position illustrated in full lines in FIG. 1 and the retracted position illustratbd in broken lines. In the operative position the housing projects laterally from the base frame. In this position the housing is protected against damage by the overlying structural frame 94. This frame also extends transversely across the rearward end of the base frame above the winch assembly, providing protection of the latter. At the opposite end of the base frame the structural frame may include a hollow post 96 extending vertically upward for the adjustable reception therein of an extension column 98.

As previously noted, the operative position of the housing is laterally outward of the base frame. In some instances the lateral width of the base frame may be the maximum allowable for transport on the highways. In such event it is necessary to retract the housing to the broken line position illustrated, inward of the lateral side of the base frame. This is accommodated by the pivotal mounting the housing.

Figure 1:
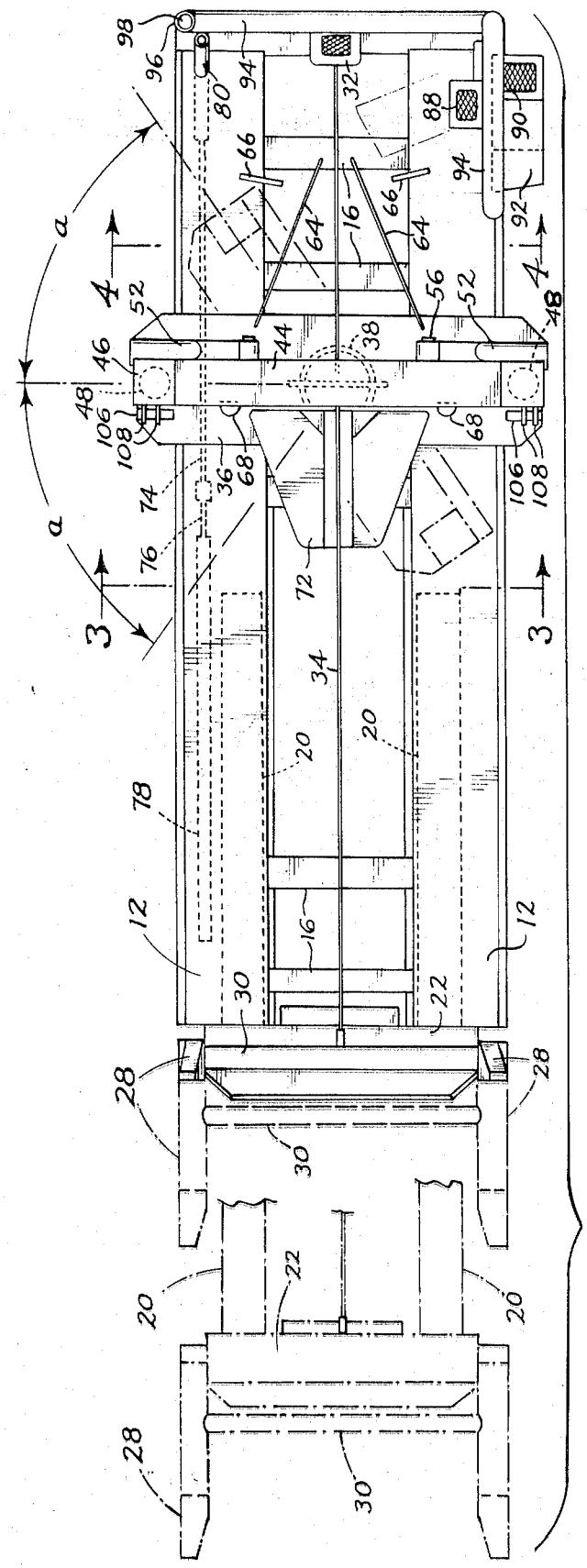
FIG. 1 is a plan view of a truck pre-loader embodying the features of this invention, parts being shown in broken lines in selected positions of adjustment.

For the same reason, it is desirable that the turntable be pivoted to the broken line position illustrated in FIG. 1, so that it lies within the lateral boundaries of the base frame during transport of the pre-loader over the highways.

Figure 5:
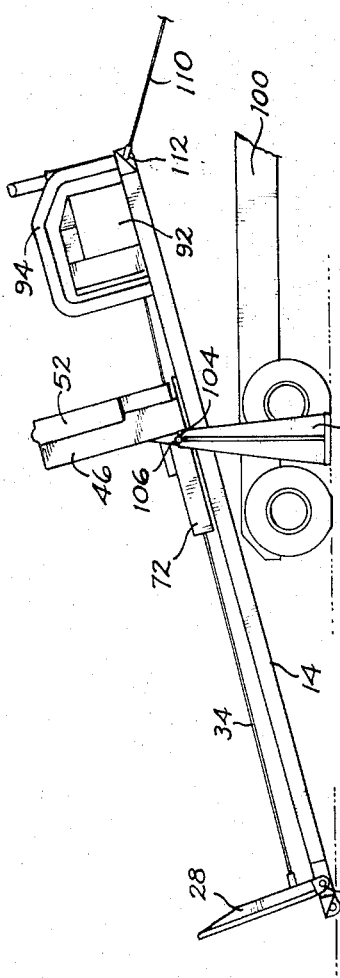
FIG. 5 is a fragmentary view in side elevation illustrating the manner in which the truck pre-loader may be loaded upon and removed from a transport vehicle.

Referring now to FIG. 5 of the drawings, means is provided for facilitating loading and unloading of the pre-loader onto and from a transport vehicle. In the embodiment illustrated, the transport vehicle is in the form of a low bed truck 100. The loading and unloading means comprises a pair of elongated support jacks 102. Each support jack has a ground-engaging bottom end. The upper end of each support jack is contoured to provide an arcuate pocket or saddle 104 adapted freely to receive therein a pin 106 extending laterally from each side of the rearward vertically movable load support member. In this regard each pin is mounted in a pair of laterally spaced brackets 108 for lateral adjustment so as to extend outwardly of the load support member for seating in the saddle of each support jack.

Figure 2:
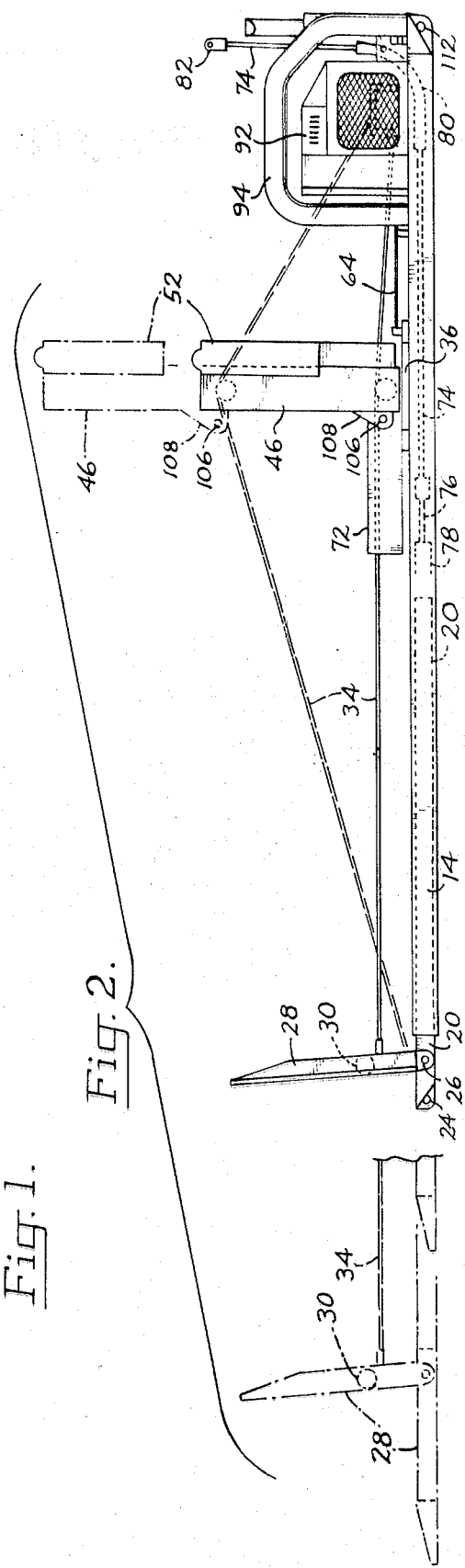
FIG. 2 is a view in side elevation, as viewed from the bottom in FIG. 1.

When it is desired to load the pre-loader onto a transport truck, the rearward vertically movable load support member is elevated to its upwardmost position, as illustrated in broken lines in FIG. 2. The pair of support jacks 102 then are positioned one adjacent each lateral side of the base frame with the saddles 104 seating the projecting ends of the pins 106 and the lower ends of the support jacks resting upon the ground. The hydraulic cylinders 48 then are supplied with fluid pressure to retract the piston rods 50 and thus lower the load support member toward the turntable plate 36. Accordingly, the elongated base frame is inclined rearwardly to the position illustrated in FIG. 5. The low bed truck 100 then may be backed in between the lateral support jacks 102 to the position illustrated. A line 110 extending from a power winch on the truck then is connected to an eyelet 112 at the rearward end of the base frame. Then as the winch is operated to take in the line, the truck is backed correspondingly to complete the loading. Thereafter the load support member is elevated to disengage the pins 106 from the support saddles 104.

The unloading operation is substantially the reverse of the foregoing loading procedure, with the exception that a line is connected to the forward eyelet 24 and attached to a truck or tractor, or other immovable support, to enable the transport vehicle to be moved forwardly from under the pre-loader.

The operation of the pre-loader described hereinbefore now will be explained with reference to FIGS. 6-9. These figures illustrated the transfer of a pre-assembled load of logs L from the pre-loader to a logging truck. As is well known, a logging truck comprises a powered truck 114 and a trailer 116. The truck mounts a truck bunk 118 for pivotal movement on a central vertical axis. The bunk is provided with laterally spsaced stakes 120 which are adjustable between a downwardly retracted position and an upwardly extending operative position. The trailer includes a wheel-supported body 122 and an elongated reach 124. The reach is coupled pivotally at its forward end to a rearward extension of the truck. The reach extends rearwardly through a coupling member on the trailer body, for accommodating adjustment of the trailer to variously desired positions along the length of the reach. The trailer body mounts a trailer bunk 126 provided with a pair of laterally spaced stakes 128 which also are adjustable between the aforementioned retracted and extended positions.

Figure 6:
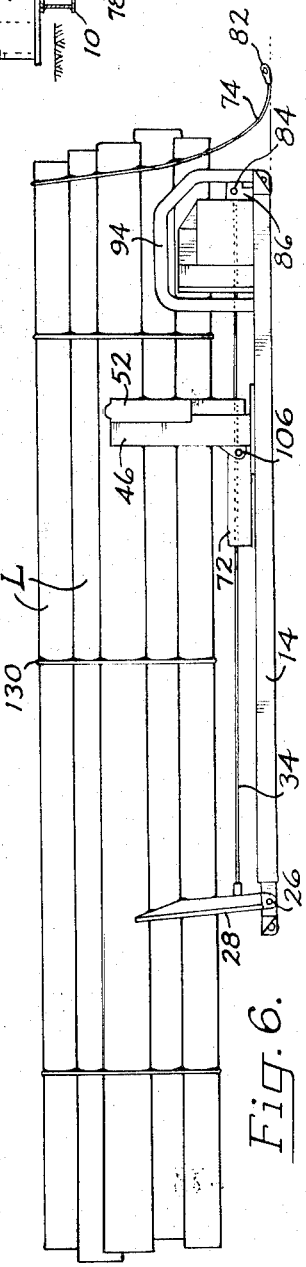

Referring first to FIG. 6, the pre-loader is shown resting upon the ground and supporting an assembled load of logs L between the stanchions 28 of the forward cradle and the stakes 52 of the rearward cradle, with the latter retracted to its lowermost position and locked in the transverse position by engagement of the locking lugs 68 in the registering openings 70. The load of logs is confined by a plurality of longitudinlly spaced cables, chains or other suitable binding lines 130, and the stakes 52 on the reaward cradle are extended inwardly to he closed position illustrated in solid lines in FIG. 3.

Figure 3:
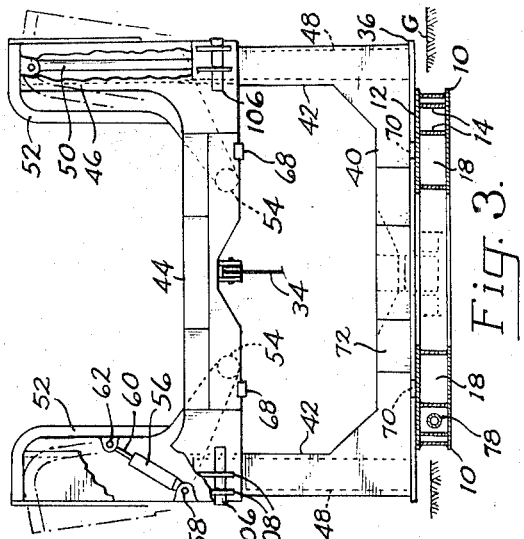
FIG. 3 is a transverse sectional view taken on the line 3—3 in FIG. 1, parts being broken away to disclose details of internal construction.

FIG. 3 also shows the base frame located below normal ground level G. This is accomplished by bulldozing an area to provide the frame with a solid foundation. The dirt thus removed may be filled into the space between the laterally spaced wheel supporting sections of the frame.

Figure 7:
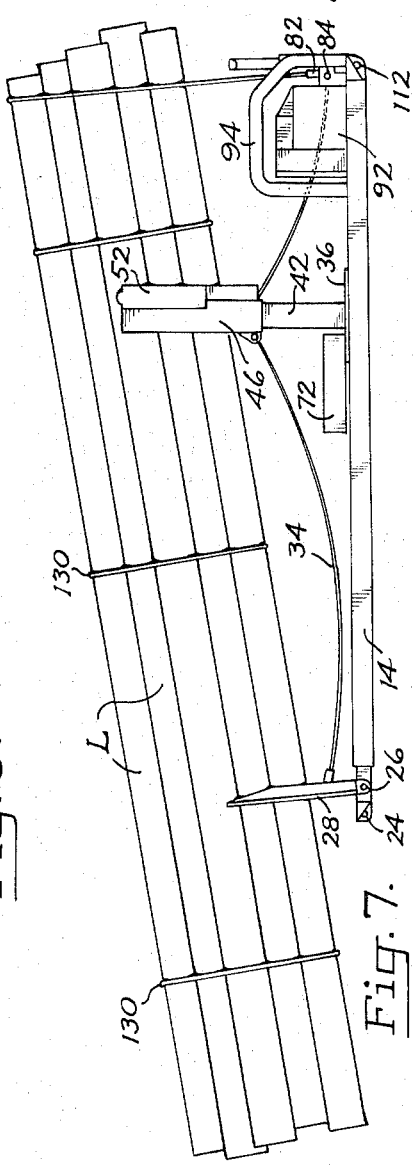

Referring now to FIG. 7, the vertically movable rearward cradle assembly is elevated to an intermediate position. For this purpose it will be understood that the line 34 connected to the forward cradle is relaxed, by paying off line from the winch 32, to enable elevation of the rearward cradle. The restraining line 74 then is looped over the rearward end of the load of logs and the eyelet 82 of the free end of the line is secured to the base frame by means of the pin 84. Fluid pressure then is supplied to the rearward end of the cylinder 78 to effect retraction of the piston rod 76 and tightening of the restraining line over the load.

Referring now to FIG. 8, the rearward cradle assembly now is elevated to a further upward position while retaining the restraining line 74 in its previously tightened condition. As a result, the forward end of the load is elevated from the forward cradle, whereupon the latter pivots downward by gravity to its retracted position. With the load thus elevated and the forward cradle retracted, the space under the load forwardly of the elevated rear cradle is completely unobstructed. Accordingly, the truck operator may maneuver the logging truck and trailer with speed and facility onto the wheel support sections of the base frame. In this regard, it will be understood that the truck and trailer stakes may have been retracted during such maneuvering. Further, it will be appreciated that the truck and trailer may be moved angularly with respect to the base frame as dictated by the degree of confinement of the area. The trailer wheels may ride up onto the wheel support sections of the base support at various angles and then properly aligned with the rearward cradle by means of the wheel guide 72. In such instance, at least the far stakes of the truck and trailer unit will have been retracted prior to such angular maneuvering.

When the truck and trailer is in properly aligned position under the load, the truck and trailer stakes, if retracted, are elevated to operative position, as shown in FIG. 8, and the vertically movable rear cradle is lowered (FIG. 9). The forward end of the load of logs thereupon swings downwardly onto the truck bunk 118 between the stakes 120 and the rearward portion of the load is deposited upon the trailer bunk 126 between the stakes 128 thereof. In this position the restraining line 74 is slackened and therefore may be uncoupled at its free end from the anchor pin 84 and thrown clear of the load. The power stakes 52 then are opened, laterally outward, by application of hydraulic pressure to the cylinders 56.

It is to be noted in FIG. 9 that the rearward cradle has been lowered sufficiently to tranfer the load of logs to the trailer bunk, but that it is still elevated from the turntable plate 36. Accordingly, the locking lugs 68 still are disengaged from the registering openings 70, and therefore the turntable is free to rotate. Accordingly, the truck operator may move the loaded truck and trailer angularly forward, if desired, in a manner to effect swinging of the load of logs laterally about the vertical axis of the turntable.

FIG. 9 illustrates the load of logs resting upon the trailer bunk a substantial distance forwardly of its rearward end. To provide greater stability for transporting the load, it is desirable to move the trailer bunk to a more rearward position relative to the load. This is accomplished by the procedure illustrated in FIG. 10.

Thus, the rearward cradle is lowered below the rearward portion of the load, so that the load rests upon the trailer bunk, and power stakes 52 are opened. The truck and trailer assembly then is driven forwardly to the broken line position of the trailer 116. The power stakes 52 then are closed and the rear cradle is elevated to lift the rearward portion of the load from the trailer bunk. The free end of the operating line 34 from the winch 32 then is connected to the trailer body 122 and the coupling member of the latter is disconnected from the reach 124. The winch then is operated to pull the trailer rearward to the position shown in full lines in FIG. 10. The coupling member of the trailer then is reconnected to the reach, the operating line 34 is disconnected from the trailer body and the rearward cradle is lowered to redeposit the rearward end of the load onto the trailer bunk. The power stakes 52 then are opened to free the load for removal on the logging truck.

FIG. 11 illustrates the manner in which a load of logs may be transferred to a logging truck from a pre-loader located in a severely restricted area. Thus, the broken line 132 forwardly of the load of logs may represent a cluster of trees, a hill, a cliff, or other obstacle. With the load of logs elevated on the pre-loader to the position illustrated in FIG. 8, the truck and trailer assembly may be manipulated to the jack knifed position illustrated in full lines. In this position the truck bunk 118 is centered under the forward end of the load and is rotated to align the stakes 120 transversely of the load. The right hand trailer stake, previously retracted, then is elevated to operative position. The rearward cradle now is lowered sufficiently to lower the forward end of the load onto the truck bunk, while retaining the rearward end of the load elevated. The truck operator then may move the truck forward along the path of the broken line arrows 134 until the load and truck are in the position illustrated in broken lines. During this movement the rearward crade pivots with the turntable 36 through the angle $b$ indicated. The right hand trailer bunk stake 128 previously lowered, then is elevated to operative position, whereupon the loaded truck may be moved away in any desired direction.

It is to be noted from the foregoing illustrations that the logs comprising the load are self-supporting throughout their length, thereby enabling the forward end of the load to be elevated by the cooperative arrangement of the vertically movable rear cradle and the restraining line 74. The same mode of operation may be utilized for similar self-supporting materials, such as pipes, beams, etc.

The pre-loader of this invention also may be utilized for transferring to a truck a pre-assembled load of boxes, crates and similarly small articles, by the use of a load-supporting platform. Thus, referring to FIG. 12 of the drawings there is illustrated an elongated rectangular platform 136 which is supported adjacent its rearward end on the vertically movable rear cradle. Rearwardly of the cradle the platform may be supported by the restraining line 74 previously described. In the alternative, as illustrated, a fluid pressure piston-cylinder unit is connected pivotally at one end, for example cylinder 138, to the base frame and at the opposite end, for example piston rod 140, pivotally and releasably to the rearward end of the platform. The forwardly projecting portion of the platform need not be supported.

The platform thus may be loaded with a plurality of boxes, etc. A truck then may be backed into position under the forwardly projecting portion of the platform, whereupon the rearward cradle is lowered simultaneously with retraction of the piston-cylinder unit until the platform rests upon the truck. The piston-cylinder unit then is disconnected from the platform. The load, including the platform, then may be hauled away.

Figure 14:
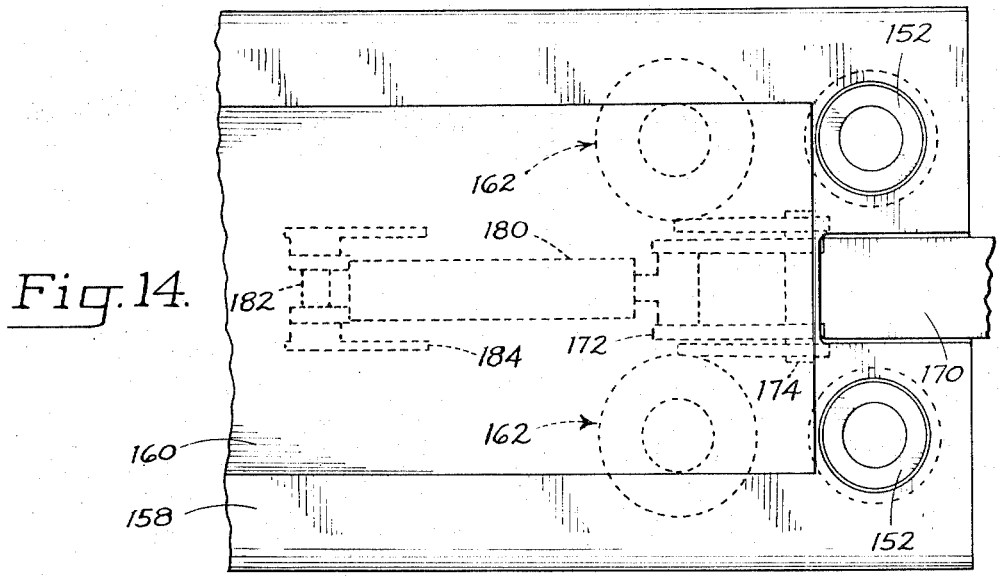
FIG. 14 is a fragmentary plan view as viewed from the top in FIG. 13.
Figure 15:
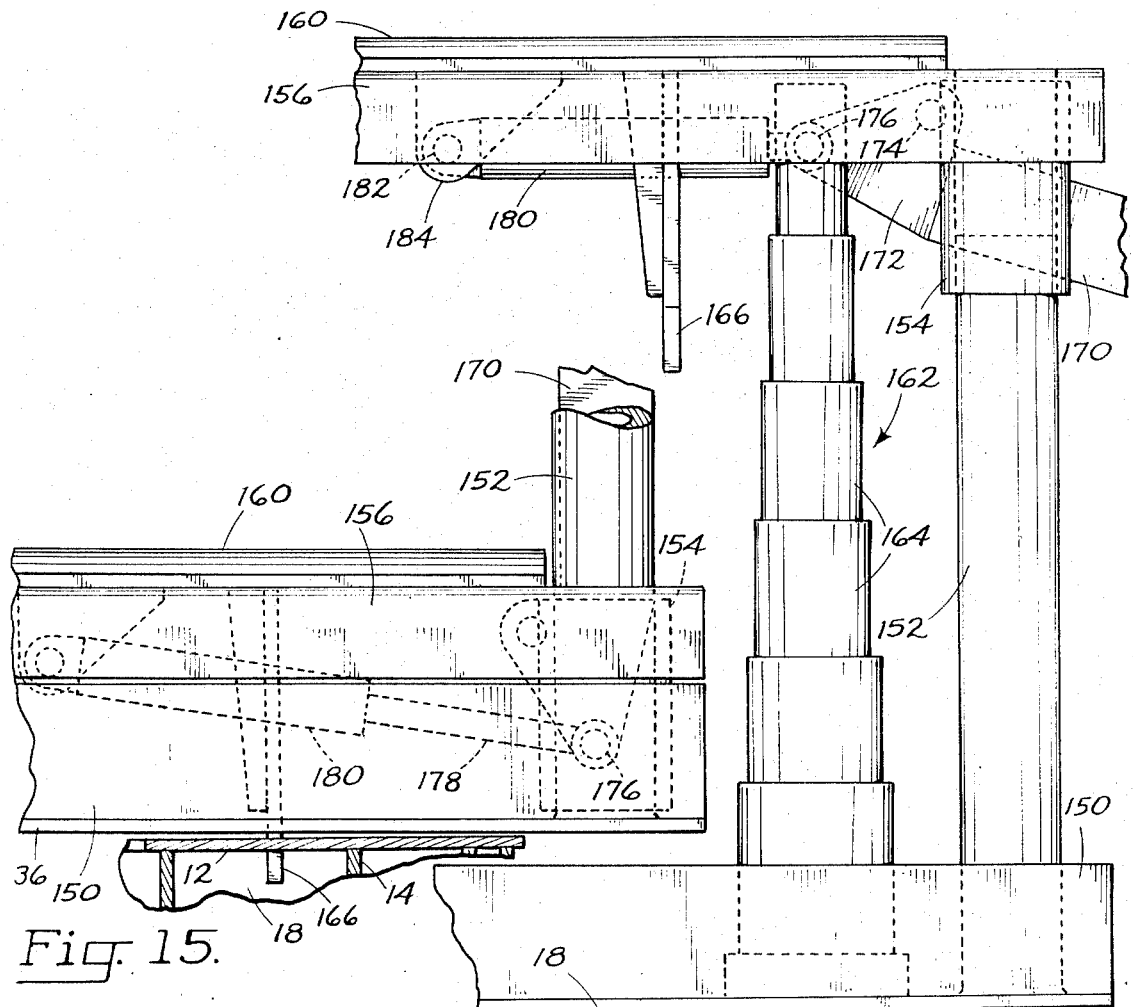
FIG. 15 is a fragmentary sectional view similar to FIG. 13, showing the load support in lowered position.
Figure 13:
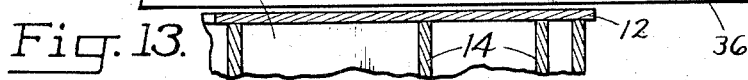
FIG. 13 is a fragmentary transverse sectional view, similar to FIG. 3, of another form of load support assembly embodying the features of this invention, with the load support shown in raised position.

FIGS. 13-15 illustrate another form of load support assembly. In this embodiment the turntable plate 36 supports a substantially rectangular box-shaped frame 150. Adjacent each of the opposite ends of the frame the turntable plate supports a pair of spaced, upstanding guide posts 152 each of which slidably supports a sleeve 154 for vertical reciprocation. The sleeves are secured to a transverse load bearing member which is in the form of a box frame 156 closed on its upper side by a top plate 158. In the preferred embodiment illustrated, this top plate supports a transverse, longitudinally arcuate load bearing plate 160 which accommodates pivotal rocking of the rearward portion of the load.

Vertical reciprocation of the load bearing member 156 is provided by at least one pair of spaced fluid power cylinder units 162 mounted on the turntable plate and located one adjacent each of the opposite ends of the latter. Two such pairs of cylinder units are provided in the embodiment illustrated. Each fluid pressure cylinder unit is of the segmental, telescoping type, there being five such segments 164 illustrated. The upper, inwardmost segment is secured at its upper end to the top plate 158 of the load bearing member. Thus, upon application of fluid pressure to the lowermost segment, the telescoping segments are caused to extend and thus elevate the load bearing member from the lowermost position illustrated in FIG. 15 to the elevated position illustrated in FIG. 13.

The load bearing member is lowered from its elevated position by gravity, upon release of fluid pressure if the cylinder unit is of the single action type, or by appropriate application of fluid pressure to the cylinder unit if the latter is of the double action type.

In the lowered position of the load bearing member (FIG. 15), the turntable plate is locked against rotation by means of a pair of locking lugs 166 each of which extends downward from the load bearing member through aligned openings in the turntable plate and underlying deck plate 12, in manner similar to the locking arrangement previously described.

The load bearing member supports a retractable elongated stake 170 at each of its opposite, transverse ends. Thus, each stake is secured at its lower end to a pair of spaced plates 172. The plates are secured to the load bearing member by means of a longitudinally extending shaft 174, for pivotal movement of the stake in the transverse direction of the load bearing member. The plates also support a longitudinally extending shaft 176 to which is pivotally connected the extending end of the piston rod 178 of a fluid pressure piston-cylinder unit. The opposite end of the cylinder 180 of the unit is supported pivotally by a shaft 182 carried by a pair of brackets 184 secured to the load support member. An opening in the locking lug 166 receives the cylinder therethrough and accommodates movement of the latter during extension and retraction of the stake.

Thus, with fluid pressure applied to the end of the cylinder 180 opposite the piston rod 178, the latter is caused to be extended from the cylinder, thereby rotating the stake counterclockwise about the pivot shaft 174 to the elevated, operative position illustrated in FIG. 14. Conversely, by application of fluid pressure to the end of the cylinder adjacent the piston rod, the latter is caused to retract into the cylinder and thus pivot the stake clockwise about the pivot shaft to the retracted position illustrated in FIG. 13.

In the retracted position the stake is disposed below and laterally of the load supporting plane of the load supporting member. With the laterally spaced stakes thus disposed in retracted position, after a load has been transferred to a truck, the latter may move away from the preloader at any desired angle since the load is free to pivot and slide relative to the transverse load support member. Accordingly, the turntable may not be essential in this embodiment if the load is such that the stakes may be retracted as described.

Figure 17:
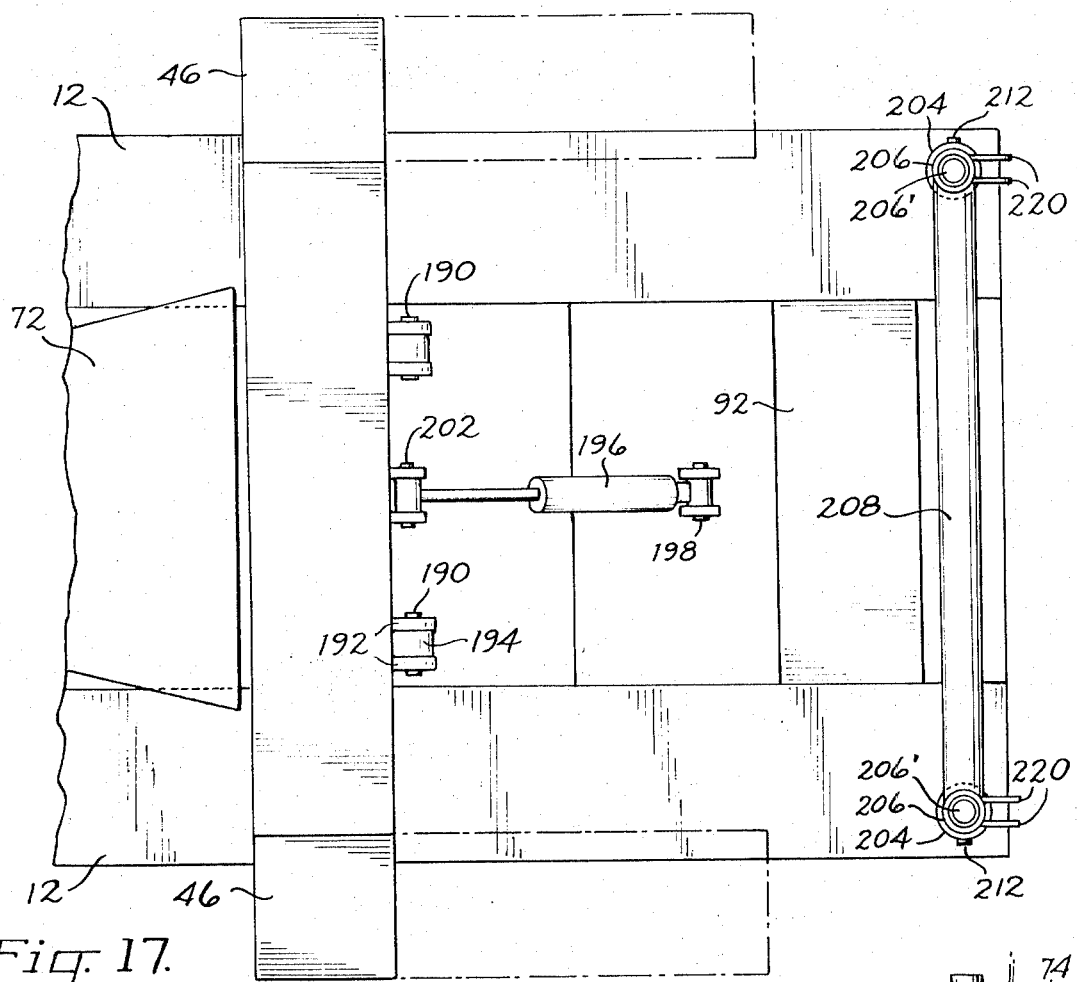
FIG. 17 is a fragmentary plan view as viewed from the top in FIG. 16.
Figure 16:
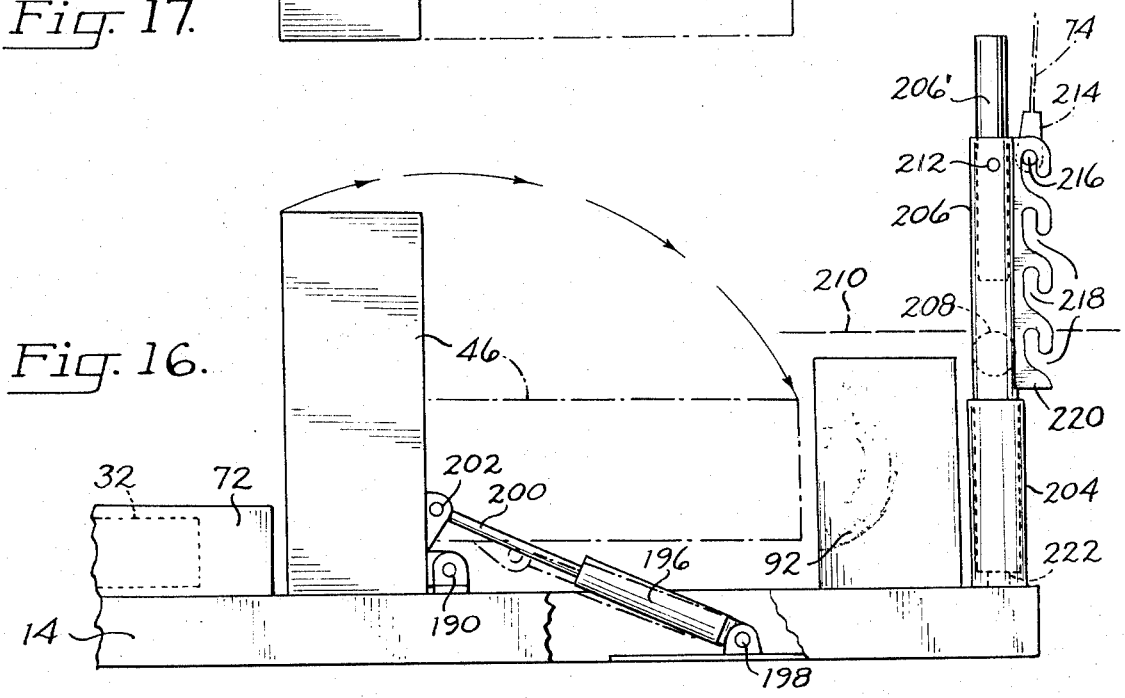
FIG. 16 is a fragmentary view in side elevation of still another form of load support assembly embodying the features of this invention.

In the embodiment illustrated in FIGS. 16 and 17 the vertically adjustable rear load support assembly 42–62 is mounted on the base pivotally for adjustment between the vertical, operative position shown in full lines and the horizontal, retracted position shown in broken lines. To this end the U-shaped guide frame 40, 42 (FIG. 3) is connected to the base by a pair of transversely spaced pivot shafts 190 extending through axially aligned openings in bearing lugs 192 and 194 secured to the base and guide frame, respectively.

Power means for pivoting the rear load support assembly is provided by an extensible fluid pressure piston-cylinder unit. One end of the cylinder 196 of the unit is mounted pivotally on the base by means of a pivot pin 198, and the projecting end of the piston rod 200 of the unit is connected pivotally to the transverse structural member 40 by means of a pivot pin 202. Thus, by appropriate application of fluid pressure to the piston-cylinder unit, to effect extension and retraction of the piston rod relative to the cylinder, the load support assembly is pivoted between the vertical and horizontal positions illustrated.

Means is provided at the rear end of the base for temporarily supporting the rear end of a load, preliminary to raising the load by means of the vertically adjustable rear load support assembly. Thus, there is mounted adjacent the rear lateral sides of the base a pair of upstanding hollow stanchion guide sleeves 204 each of which receives freely therein the lower end portion of an elongated, upstanding stanchion 206. The pair of stanchions are interconnected intermediate their ends by a transverse load supporting beam 208. This beam is positioned vertically so that the lower side of a load, indicated in FIG. 16 by the broken line 210, is spaced vertically above the vertically adjustable rear load support assembly 42–62 when the latter is in the retracted position illustrated in broken lines.

If desired, the vertical height of the stanchions 206 may be increased by the use of removable stanchion posts 206' receivable in the upper hollow ends of the stanchions and secured therein by such means as locking pins 212.

In the embodiment illustrated in FIGS. 16 and 17, the engine housing 92 is positioned centrally of the base, with its upper end disposed below the load supporting surface of the transverse beam 208.

Also, in this embodiment the adjustable cylinder 78 (FIG. 1) for the restraining line 74 is omitted. The restraining line 74 is provided at each of its opposite ends with a connector 214 which includes a transverse pin 216 adapted to be received removably in a selected one of a plurality of vertically spaced pairs of notches 218 formed in a pair of spaced brackets 220 projecting rearward from the stanchion 206.

Accordingly, one end of the restraining line 74 is attached to one of the stanchions 206, by means of the corresponding connector 214, and the restraining line then is looped over the load. The connector at the opposite end of the line then is secured in an appropriate one of the associated notches 218 in the brackets in the opposite stanchion.

If desired, the pair of brackets 220 on one of the stanchions may simply be provided with one or more vertically spaced pairs of aligned holes for the reception of an anchor bolt. In such case, the associated connector 214 is provided with a corresponding opening, rather than a transverse pin.

Further, in the embodiment illustrated in FIGS. 16 and 17, the box-like wheel guide member 72 is mounted on the base forwardly of the vertically adjustable rear load support assembly, and houses the power winch 32 for the line 34.

Means also may be incorporated in the pre-loader for weighing a pre-assembled load. In the embodiment illustrated in FIG. 16, a fluid pressure or electric load-weighing device 222, many types of which are available commercially, is interposed between the bottom end of each stanchion 206 and the base, being confined within the hollow sleeve 204. It will be apparent to those skilled in the art that the front stanchion 28 may be constructed in manner similar to the rear stanchion illustrated in FIG. 16, in order to incorporate such load-weighing devices.

In the operation of the pre-loader illustrated in FIGS. 16 and 17, the vertically adjustable rear load support assembly 42–62 is retracted to the broken line position illustrated in FIG. 16. A load, such as logs L then is deposited for initial support on the front beam 30 and rear beam 208. The restraining line 74 then is looped over the load and secured at its opposite ends, as previously explained. The vertically adjustable rear load support assembly then is pivoted to the vertical, operative position illustrated in full lines in FIG. 16, the U-shaped load support member 44, 46 is elevated by operation of the cylinders 48, in accordance with the sequence of operations previously described in connection with FIGS. 6–9. The vertically adjustable rear load support assembly then is again retracted to the broken line position illustrated, whereupon the loaded truck may be driven away.

From the foregoing it will be appreciated that the present invention provides a truck pre-loader which is versatile in its utility and materially reduces the inoperative or idle time for a truck and truck operator, by enabling substantially unrestricted and unobstructed maneuvering of a truck relative to the pre-loader. The pre-loader is of extremely rugged construction for the handling of large and heavy loads and yet it may be adjusted for legal transport over the highways to off-the-road operating sites. In this latter regard the pre-loader also may include means to facilitate its loading onto and unloading from a transport vehicle with speed and facility.

It will be apparent to those skilled in the art that various changes may be made in the size, shape, type, arrangement and number of parts described hereinbefore without departing from the spirit of this invention.

Having now described my invention and the manner in which it may be used, I claim:

1. A truck pre-loader comprising
   a. a base,
   b. a transverse load-supporting member mounted on the base for vertical reciprocation and adapted to support a load intermediate the ends of the latter,
   c. a connecting member arranged to interengage the base and a load at a position on the latter spaced longitudinally from the load-supporting member, and
   d. power means interengaging the base and load supporting member for moving the latter vertically relative to the connecting member whereby to effect vertical movement of the end of the load opposite the connecting member.

2. The truck pre-loader of claim 1 including a second load-supporting member spaced longitudinally of the first named load-supporting member and mounted for pivotal movement between a downwardly retracted position and an upwardly extending load-supporting position.

3. The truck pre-loader of claim 2 including power means on the base engageable with the second load-supporting member for moving the latter between said retracted and extended positions.

4. The truck pre-loader of claim 2 wherein the base includes a pair of elongated telescoping frame sections one supporting the first named load-supporting member and the other supporting the second load-supporting member.

5. The truck pre-loader of claim 1 wherein the load-supporting member comprises a substantially U-shaped cradle member adapted to confine a load between the spaced sides thereof.

6. The truck pre-loader of claim 5 wherein the spaced sides of the cradle member are movable transversely to vary the spacing therebetween.

7. The truck pre-loader of claim 6 including power means interengaging the movable and fixed parts of the cradle member for moving said spaced sides.

8. The truck pre-loader of claim 1 wherein the connecting member comprises a flexible line adapted to engage a load intermediate the ends of the line and arranged for connection at its opposite ends to the base.

9. The truck pre-loader of claim 8 including power means on the base engaging one end of the line for moving the latter relative to the load.

10. The truck pre-loader of claim 9 wherein the power means comprises an extensible fluid pressure piston-cylinder unit.

11. The truck pre-loader of claim 1 wherein the power means comprises at least one pair of laterally spaced extensible fluid pressure cylinder means each connected at one end to the base and at the opposite end to the load-supporting member.

12. The truck pre-loader of claim 11 wherein each cylinder comprises a fluid pressure piston-cylinder unit.

13. The truck pre-loader of claim 11 wherein each cylinder means comprises a telescopic, segmental fluid pressure cylinder.

14. The truck pre-loader of claim 1 wherein the load-supporting member is mounted upon the base for pivotal movement on a substantially vertical axis.

15. The truck pre-loader of claim 1 wherein the base includes a base frame and turntable means on the base frame mounting the load-supporting member thereon for pivotal movement on a substantially vertical axis.

16. The truck pre-loader of claim 15 including lock means interengaging the load-supporting member and base frame when the load-supporting member is in its lowermost position of vertical reciprocation and is disposed tranversely of the base frame.

17. The truck pre-loader of claim 15 including resilient means interengaging the turntable means and base frame for urging the turntable means to a normal position in which the load-supporting member is disposed transversely of the base frame.

18. The truck pre-loader of claim 15 wherein the power means comprises a pair of laterally spaced fluid pressure piston-cylinder units each connected at one end to the turntable means and at the opposite end to the load-supporting member.

19. The truck pre-loader of claim 1 including a pair of elongated stakes mounted one adjacent each end of the load-supporting member for pivotal movement between an operative position extending upwardly from the load-supporting member and a retracted position extending outwardly from and below the load-supporting plane of the load-supporting member.

20. The truck pre-loader of claim 19 including power means interengaging the load-supporting member and each stake for moving the latter between said operative and retracted positions.

21. The truck pre-loader of claim 1 including an elongated load-supporting platform mounted intermediate its ends on the load-supporting member, the connecting member interengaging the base and platform.

22. The truck pre-loader of claim 21 wherein the connecting member comprises an extensible fluid pressure piston-cylinder unit interengaging the base and platform.

23. The truck pre-loader of claim 1 including a pair of elongated jack members adapted to be supported at their lower ends on the ground and provided at their upper ends with means engageable with the load-supporting member whereby vertical movement of the latter effects vertical movement of the base enabling mounting and dismounting of the pre-loader relative to the transport vehicle.

24. The truck pre-loader of claim 2 including means for adjusting the vertically movable load-supporting member between a vertical, operative position and a substantially horizontal, inoperative position, and a third load-supporting member spaced longitudinally of the vertically movable load-supporting member to the side thereof opposite the second load-supporting member.

25. The truck pre-loader of claim 24 wherein the adjusting means comprises pivot means connecting the vertically movable load-supporting member to the base for pivotal movement about a transverse axis, and power means interengaging the load-supporting member and base for pivoting said load-supporting member about said axis.

* * * * *